United States Patent
Fujii et al.

(10) Patent No.: US 11,597,179 B2
(45) Date of Patent: Mar. 7, 2023

(54) TRANSPARENT RESIN FILM, DECORATIVE BOARD, AND METHOD FOR PRODUCING DECORATIVE BOARD

(71) Applicant: Dai Nippon Printing Co., Ltd., Tokyo (JP)

(72) Inventors: Ryo Fujii, Tokyo (JP); Satoshi Furuta, Tokyo (JP); Tomomi Nakajima, Tokyo (JP); Yoshiaki Netsu, Tokyo (JP); Toshinaru Kayahara, Tokyo (JP); Yosuke Sumida, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 17/283,703

(22) PCT Filed: Sep. 30, 2019

(86) PCT No.: PCT/JP2019/038606
§ 371 (c)(1),
(2) Date: Apr. 8, 2021

(87) PCT Pub. No.: WO2020/075564
PCT Pub. Date: Apr. 16, 2020

(65) Prior Publication Data
US 2022/0001645 A1    Jan. 6, 2022

(30) Foreign Application Priority Data
Oct. 12, 2018  (JP) .............................. JP2018-193830

(51) Int. Cl.
*B32B 3/30* (2006.01)
*B32B 7/12* (2006.01)
(Continued)

(52) U.S. Cl.
CPC .................. *B32B 3/30* (2013.01); *B32B 7/12* (2013.01); *B32B 21/02* (2013.01); *B32B 21/08* (2013.01);
(Continued)

(58) Field of Classification Search
CPC .. B32B 3/30; B32B 7/12; B32B 21/02; B32B 21/08; B32B 27/16; B32B 27/32;
(Continued)

(56) References Cited

U.S. PATENT DOCUMENTS

| 6,762,504 | B1 | 7/2004 | Yamada |
| 2003/0164243 | A1 | 9/2003 | Arakawa et al. |
| 2018/0043653 | A1* | 2/2018 | Sutou .................... B32B 27/304 |

FOREIGN PATENT DOCUMENTS

| CN | 1392214 A | 1/2003 |
| CN | 1440234 A | 9/2003 |

(Continued)

*Primary Examiner* — Catherine A. Simone
(74) *Attorney, Agent, or Firm* — Locke Lord LLP

(57) ABSTRACT

The present invention provides a transparent resin film that is capable of imparting excellent design properties to a decorative board and is excellent in adhesion to a picture layer, a decorative board including the transparent resin film, and a method for producing the decorative board. Provided is a transparent resin film for protecting a picture layer provided on one side of a substrate, the transparent resin film having a pattern of protrusions and depressions on a picture layer side, the pattern of protrusions and depressions having a maximum height roughness Rz defined in JIS B 0601 (2001) within a range of 15 μm or larger and 70 μm or smaller.

6 Claims, 1 Drawing Sheet

(51) Int. Cl.
  *B32B 27/32* (2006.01)
  *B32B 21/02* (2006.01)
  *B32B 21/08* (2006.01)
  *B32B 27/16* (2006.01)
  *B32B 37/12* (2006.01)
  *B32B 38/06* (2006.01)
  *B44C 5/04* (2006.01)
  *E04F 13/08* (2006.01)

(52) U.S. Cl.
  CPC .............. *B32B 27/16* (2013.01); *B32B 27/32* (2013.01); *B32B 37/12* (2013.01); *B32B 38/06* (2013.01); *B44C 5/0446* (2013.01); *E04F 13/0873* (2013.01); *B32B 2250/03* (2013.01); *B32B 2255/10* (2013.01); *B32B 2255/26* (2013.01); *B32B 2307/412* (2013.01); *B32B 2451/00* (2013.01)

(58) Field of Classification Search
  CPC ............ B32B 2250/03; B32B 2255/10; B32B 2255/26; B32B 2307/412; B32B 2451/00; B44C 5/0446; E04F 13/0873
  See application file for complete search history.

(56) References Cited

FOREIGN PATENT DOCUMENTS

| | | |
|---|---|---|
| CN | 107617547 A | 1/2018 |
| EP | 3202565 A1 | 8/2017 |
| JP | H08-118578 A | 5/1996 |
| JP | H11-277708 A | 10/1999 |
| JP | 2003-138036 A | 5/2003 |
| JP | 2005-074682 A | 3/2005 |
| JP | 2007-092036 A | 4/2007 |
| JP | 2016-084433 A | 5/2016 |
| JP | 2016-190480 A | 11/2016 |
| JP | 2016-190481 A | 11/2016 |
| WO | WO-2016159119 A1 * 10/2016 ............. B29C 35/02 |

\* cited by examiner

TRANSPARENT RESIN FILM, DECORATIVE BOARD, AND METHOD FOR PRODUCING DECORATIVE BOARD

CROSS REFERENCE TO RELATED APPLICATIONS

This application is related to three co-pending applications: "DECORATIVE BOARD, TRANSPARENT RESIN FILM, AND DECORATIVE BOARD PRODUCTION METHOD" filed even date herewith in the names of Satoshi Furuta, Ryo Fujii, Tomomi Nakajima, Yoshiaki Netsu, Toshinaru Kayahara and Yosuke Sumida as a national phase entry of PCT/JP2019/038597; "TRANSPARENT RESIN FILM, DECORATIVE BOARD, AND METHOD FOR PRODUCING DECORATIVE BOARD" filed even date herewith in the names of Satoshi Furuta, Ryo Fujii, Tomomi Nakajima, Yoshiaki Netsu, Toshinaru Kayahara and Yosuke Sumida as a national phase entry of PCT/JP2019/038603; and "TRANSPARENT RESIN FILM, DECORATIVE BOARD, AND METHOD FOR PRODUCING DECORATIVE BOARD" filed even date herewith in the names of Satoshi Furuta, Ryo Fujii, Tomomi Nakajima, Yoshiaki Netsu, Toshinaru Kayahara and Yosuke Sumida as a national phase entry of PCT/JP2019/038611; which applications are assigned to the assignee of the present application and all three incorporated by reference herein.

TECHNICAL FIELD

The present invention relates to a transparent resin film, a decorative board including the transparent resin film, and a method for producing the decorative board.

BACKGROUND ART

A recent spread of ink-jet printing methods using inkjet printers has enabled production of decorative boards used for applications such as building materials or decorative molded articles of many kinds in small quantities and printing of complicated patterns (e.g., letters, numbers, and graphics) as picture layers.

The ink-jet printing methods advantageously enable printing not only on film substrates but also on substrates having flat surfaces, projections and depressions, and curved surfaces.

Since a picture layer prepared by an ink-jet printing method is typically provided on the outermost surface of the substrate, a transparent resin film is necessarily provided on a surface of the picture layer for the purpose of protecting the picture layer having insufficient surface properties such as scratch resistance, stain resistance, and weather resistance.

Patent Literature 1, for example, discloses a technique of providing a transparent resin layer and a transparent protective layer on a surface of a picture layer to reduce or prevent defects such as nonuniformity or flaws of a decorative board and forming a pattern by projections and depressions on a surface of the decorative board to express a design such as a realistic wood grain design.

However, insufficient adhesion between a picture layer and a transparent resin film provided on a surface of the picture layer has conventionally remained as an issue, leaving room for improvement.

CITATION LIST

Patent Literature

Patent Literature 1: JP 2005-74682 A

SUMMARY OF INVENTION

Technical Problem

The present invention aims to provide a transparent resin film that is capable of imparting excellent design properties to a decorative board and is excellent in adhesion to a picture layer, a decorative board including the transparent resin film, and a method for producing the decorative board.

Solution to Problem

The present inventors made intensive studies to solve the above problem and focused on the shape of a surface on a picture layer side of a transparent resin film. As a result, they found out that formation of a predetermined pattern of protrusions and depressions on a surface on a picture layer side of a transparent resin film can increase the contact area (surface area) between the transparent resin film and an adhesive layer provided between the transparent resin film and a picture layer, and the obtained transparent resin film is excellent in adhesion to a picture layer and design properties. Thus, the present invention was completed.

The present invention relates to a transparent resin film for protecting a picture layer provided on one side of a substrate, the transparent resin film having a pattern of protrusions and depressions on a picture layer side, the pattern of protrusions and depressions having a maximum height roughness Rz defined in JIS B 0601 (2001) within a range of 15 µm or larger and 70 µm or smaller.

The transparent resin film of the present invention preferably has a pattern of protrusions and depressions on an opposite side to the picture layer side, and the pattern of protrusions and depressions preferably has a maximum height roughness Rz defined in JIS B 0601 (2001) within a range of 30 µm or larger and 100 µm or smaller.

The transparent resin film of the present invention preferably includes an adhesion primer layer on the picture layer side.

The transparent resin film of the present invention preferably includes a surface protective layer on an opposite side to the picture layer side.

The present invention also relates to a decorative board including: a substrate; a picture layer; and the transparent resin film of the present invention, in a stated order in a thickness direction.

The present invention also relates to a method for producing the decorative board of the present invention, the method including: forming an adhesive layer on a picture layer side of a transparent resin film; and bonding the transparent resin film and the picture layer with the adhesive layer.

Advantageous Effects of Invention

The present invention can provide a transparent resin film that is capable of imparting excellent design properties to a decorative board and is excellent in adhesion to a picture layer.

The decorative board of the present invention including such a transparent resin film of the present invention has excellent design properties and is excellent in adhesion to a picture layer.

DESCRIPTION OF EMBODIMENTS

A description is given on the transparent resin film of the present invention hereinbelow.

The transparent resin film of the present invention has a predetermined pattern of protrusions and depressions on a picture layer side surface (also referred to as a contact surface hereafter). The transparent resin film of the present invention attached to a picture layer with an adhesive layer has a larger contact area between the adhesive layer and the contact surface, exhibiting excellent adhesion and favorably preventing air bubbles from entering into the contact surface to achieve excellent design properties.

A preferred example of the transparent resin film of the present invention is described with reference to FIG. 1.

Figure 1:
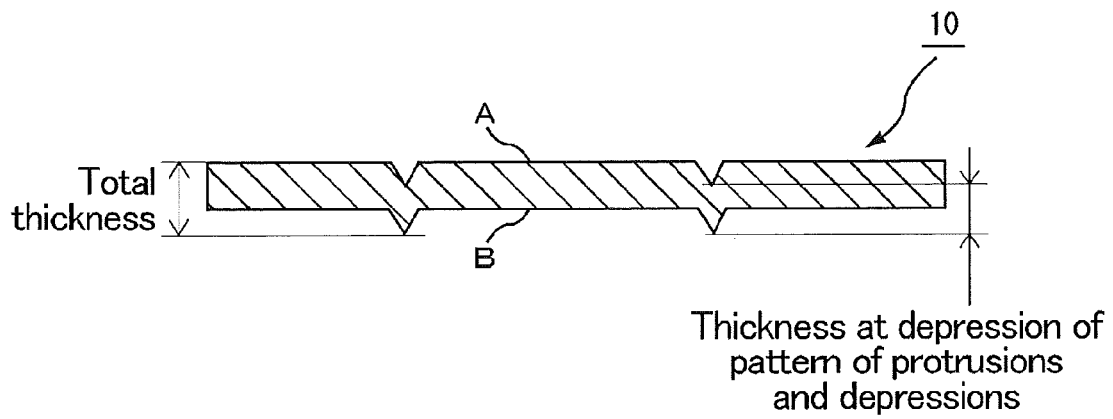
FIG. 1 is a schematic view illustrating a cross section of a preferred example of the transparent resin film of the present invention.

As illustrated in FIG. 1, a transparent resin film 10 of the present invention has a pattern of protrusions and depressions on a picture layer side surface (contact surface) B.

In the transparent resin film 10 of the present invention, the pattern of protrusions and depressions on the contact surface B has a maximum height roughness Rz defined in JIS B 0601 (2001) within a range of 15 μm or larger and 70 μm or smaller. When the Rz is smaller than 15 μm, the effect of improving adhesion when an adhesive layer is provided is insufficient. When the Rz is larger than 70 μm, air bubbles are likely to enter, upon providing an adhesive layer, between the adhesive layer and the pattern of protrusions and depressions, lowering the design properties. The lower limit of the Rz on the contact surface B is preferably 20 μm and the upper limit thereof is preferably 65 μm. The lower limit is more preferably 25 μm and the upper limit is more preferably 60 μm.

The maximum height roughness Rz on the contact surface B can be measured with a surface profilometer (product name: SURFCOM FLEX-50A, available from Tokyo Seimitsu Co., Ltd.) according to JIS B 0601 (2001), for example.

The transparent resin film 10 of the present invention has a pattern of protrusions and depressions on a surface A on the opposite side to the picture layer side (hereafter, also simply referred to as a front surface A), and the pattern of protrusions and depressions has a maximum height roughness Rz defined in JIS B 0601 (2001) within a range of 30 μm or larger and 100 μm or smaller. When the Rz on the front surface is smaller than 30 μm, the low glossiness and tactile impression may be impaired. When the Rz on the front surface is larger than 100 μm, the transmittance may be lowered, thereby lowering the visibility of the picture of the picture layer.

The lower limit of the Rz on the front surface is more preferably 35 μm and the upper limit thereof is more preferably 95 μm.

The pattern of protrusions and depressions may be formed on the front surface A and contact surface B of the transparent resin film of the present invention by any method. Examples of the method include thermal embossing and transferring of a pattern of protrusions and depressions using a shape-forming sheet.

Thermal embossing may be performed, for example, using a known sheet- or rotary embosser.

Examples of an embossed pattern include a grain pattern, a hairline pattern, a satin pattern, a wood-grain vessel pattern, a pattern of protrusions and depressions of slab surfaces, a fabric surface texture, and a linear streak pattern.

The embossing may be performed at any temperature, preferably at a temperature that reduces a loss of the roughness pattern, i.e., an embossing return, during molding by thermal press bonding.

the transparent resin film may have both surfaces subjected to formation of a pattern of protrusions and depressions by the above method. Alternatively, a pattern of protrusions and depressions may be formed on one surface of the transparent resin film by the above method in a manner that a pattern of protrusions and depressions corresponding to the pattern of protrusions and depressions on the one surface is formed on the other surface.

The transparent resin film may have any thickness. Still, the thickness at a depression of the pattern of protrusions and depressions is preferably 80 μm or larger. When the transparent resin film has a thickness at a depression of the pattern of protrusions and depressions of smaller than 80 μm, sufficient durability (e.g., abrasion resistance, scratch resistance) may not be imparted to the transparent resin film of the present invention.

The term "a depression of the pattern of protrusions and depressions" refers to the thinnest part of the transparent resin film of the present invention and a part including the deepest depression of the pattern of protrusions and depressions of the transparent resin film 10 of the present invention as illustrated in FIG. 1. It can be confirmed by microscopic observation of a cross section of the transparent resin film of the present invention. The "thickness at a depression of the pattern of protrusions and depressions" refers to the length from the bottom of the deepest depression to the contact surface B. In the case where protrusions corresponding to the pattern of protrusions and depressions are formed on the contact surface B as illustrated in FIG. 1, the "thickness at a depression of the pattern of protrusions and depressions" refers to the length from the bottom of the deepest depression to the corresponding protrusion on the contact surface B of the transparent resin film 10 of the present invention.

The upper limit of the thickness at a depression of the pattern of protrusions and depressions of the transparent resin film of the present invention is not limited, and is preferably, for example, smaller than 500 μm.

As illustrated in FIG. 1, the total thickness of the transparent resin film 10 of the present invention is the length from the front surface A to the contact surface B (to the protrusion when the protrusions described above are formed) of the transparent resin film of the present invention. The lower limit of the total thickness is preferably 60 μm and the upper limit thereof is preferably 500 μm. The lower limit is more preferably 100 μm and the upper limit is more preferably 460 μm.

Here, another preferred example of the transparent resin film of the present invention is described with reference to FIG. 2.

Figure 2:
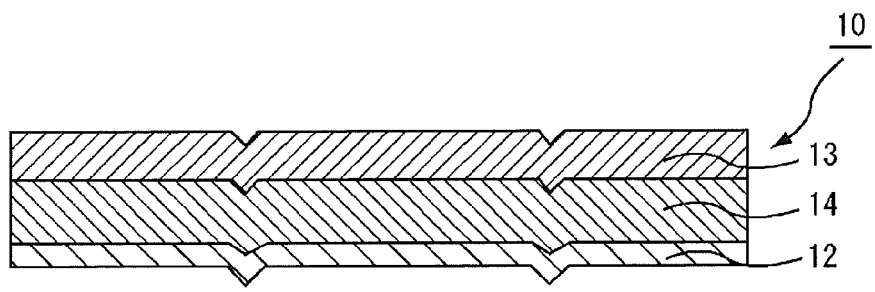
FIG. 2 is a schematic view illustrating a cross section of another preferred example of the transparent resin film of the present invention.

As illustrated in FIG. 2, the transparent resin film 10 of the present invention includes a thermoplastic resin layer 14 and a surface protective layer 13 laminated on each other, and preferably includes an adhesion primer layer 12 on the opposite side to the thermoplastic resin layer 14/surface protective layer 13 side.

The adhesion primer layer 12 on the picture layer side of the transparent resin film 10 of the present invention can increase the adhesion strength between the transparent resin film 10 and the picture layer. Accordingly, the picture layer and the adhesion primer layer 12 are preferably laminated to face each other.

The components of the transparent resin film of the present invention are described hereinbelow.

From the standpoint of increasing the adhesion strength between the thermoplastic resin layer 14 and the surface protective layer 13, a primer layer for a surface protective layer (not illustrated) is preferably provided between these layers.

Hereinbelow, the adhesion primer layer 12 and the primer layer for a surface protective layer are collectively referred to as "primer layers" when these layers are described together.

The thermoplastic resin layer is a layer for protecting the picture layer. The thermoplastic resin layer may be translucent or colored as long as the thermoplastic resin layer is clear enough to visually recognize the picture layer described later.

The thermoplastic resin contains one or more of the following resins. Examples of the thermoplastic resin include: olefin resins such as polyethylene, polypropylene, polybutene, polymethylpentene, and olefin-based thermoplastic elastomers; polyester resins such as polyethylene terephthalate, polybutylene terephthalate, polyethylene naphthalate, ethylene glycol-terephthalic acid-isophthalic acid copolymers, terephthalic acid-ethylene glycol-1,4-cyclohexane dimethanol copolymers, and polyester-based thermoplastic elastomers; acrylic resins such as polymethyl (meth)acrylate, methyl(meth)acrylate-butyl(meth)acrylate copolymers, and methyl(meth)acrylate-styrene copolymers; polycarbonate resins; polyvinyl chloride; polystyrene; and ionomers. In particular, polypropylene is favorably used as it has high tensile strength and is excellent in chemical resistance.

The term "(meth)acrylate" as used herein refers to acrylate or methacrylate.

The thermoplastic resin layer may be unstretched or uniaxially or biaxially stretched, if needed.

The thermoplastic resin layer may have any thickness. The lower limit of the thickness is preferably 20 µm and the upper limit thereof is preferably 500 µm. The lower limit is more preferably 60 µm and the upper limit is more preferably 420 µm. When the thermoplastic resin layer has a thickness of smaller than 20 µm, the thermoplastic resin layer may have insufficient strength, failing to protect the surface of the picture layer. When the thermoplastic resin layer has a thickness of larger than 500 µm, the transparent resin film may have a lower transmittance, resulting in lower visibility of the picture of the picture layer.

The thermoplastic resin layer may have a single-layer structure or a laminated structure including two or more layers.

In the case where the thermoplastic resin layer is formed of multiple resins, the types of the multiple resins may be the same or different, and the thicknesses of the multiple resins may be the same or different.

Two or more thermoplastic resin layers may be laminated by any common method. Examples of the method include dry lamination and extrusion thermal lamination.

The thermoplastic resin layer may be subjected to surface treatment such as saponification treatment, glow discharge treatment, corona discharge treatment, plasma discharge treatment, ultraviolet (UV) treatment, or flame treatment, within a range of the gist of the present invention.

The transparent resin film of the present invention preferably includes a surface protective layer on the opposite side to the picture layer side.

The surface protective layer is a layer imparting excellent durability (e.g., scratch resistance, contamination resistance, weather resistance) to the transparent resin film of the present invention. Such a transparent resin film can more favorably protect the surface of the picture layer, favorably preventing impairment of the design properties due to damage on the transparent resin film itself of the present invention.

The surface protective layer may have a single-layer structure or a multilayer structure including multiple layers formed of the same or different material(s). The following materials may be appropriately mixed to form the surface protective layer.

Any surface protective layer may be used. Examples thereof include those formed of a crosslink-cured product of a two-component curable resin or ionizing radiation-curable resin composition. The crosslink-cured product is preferably clear, and may be translucent or colored as long as the layer is clear enough to visually recognize the picture layer described later.

The two-component curable resin may be, for example, a binder resin of primer layers described later.

The ionizing radiation-curable resin is preferably, for example, an oligomer (including what we call a prepolymer and a macromonomer) having a radical polymerizable unsaturated bond or a cationic polymerizable functional group in the molecule and/or a monomer having a radical polymerizable unsaturated bond or a cationic polymerizable functional group in the molecule. The term "ionizing radiation" herein refers to an electromagnetic wave or charged particle having energy capable of polymerizing or crosslinking molecules. The ionizing radiation is typically an electron beam (EB) or ultraviolet light (UV).

Examples of the oligomer or monomer include compounds having a radical polymerizable unsaturated group (e.g., a (meth)acryloyl group, a (meth)acryloyloxy group) or a cationic polymerizable functional group (e.g., an epoxy group) in the molecule. Each of these oligomers or monomers may be used alone, or two or more thereof may be used in admixture. The term "(meth)acryloyl group" as used herein refers to an acryloyl group or a methacryloyl group.

The oligomer having a radical polymerizable unsaturated group in the molecule is preferably, for example, an oligomer of urethane (meth)acrylate, polyester (meth)acrylate, epoxy (meth)acrylate, melamine (meth)acrylate, or triazine (meth)acrylate, more preferably a urethane (meth)acrylate oligomer. An oligomer having a molecular weight of about 250 to 100000 is typically used.

The monomer having a radical polymerizable unsaturated group in the molecule is preferably, for example, a polyfunctional monomer, more preferably a polyfunctional (meth) acrylate.

Examples of the polyfunctional (meth)acrylate include diethylene glycol di(meth)acrylate, propylene glycol di(meth)acrylate, bisphenol A ethylene oxide-modified di(meth) acrylate, trimethyrolpropane tri(meth)acrylate, trimethylolpropane ethylene oxide tri(meth)acrylate, dipentaerythritol tetra(meth)acrylate, dipentaerythritol penta(meth)acrylate (pentafunctional (meth) acrylate), dipentaerythritol hexa(meth)acrylate (hexafunctional (meth)acrylate). The term "polyfunctional monomer" herein refers to a monomer having multiple radical polymerizable unsaturated groups.

In the present invention, the ionizing radiation-curable resin composition preferably further contains an ionizing radiation-curable resin component containing a urethane acrylate oligomer and a polyfunctional monomer. The ionizing radiation-curable resin component particularly preferably contains a urethane acrylate oligomer and a polyfunctional monomer at a mass ratio (urethane acrylate oligomer/polyfunctional monomer) of 6/4 to 9/1. Within such a mass ratio range, better scratch resistance can be achieved.

If needed, a monofunctional monomer may be appropriately used in addition to the ionizing radiation-curable resin component within a range of the gist of the present invention.

Examples of the monofunctional monomer include methyl(meth)acrylate, 2-ethylhexyl(meth)acrylate, phenoxyethyl (meth)acrylate.

In the case where ultraviolet light is used for crosslinking of the ionizing radiation-curable resin composition, a photopolymerization initiator is preferably added to the ionizing radiation-curable resin composition.

In the case where the ionizing radiation-curable resin composition is a resin system containing a radical polymerizable unsaturated group, the photopolymerization initiator used may be an acetophenone, a benzophenone, a thioxanthone, benzoin, a benzoin methyl ether, or a mixture of these.

In the case where the ionizing radiation-curable resin composition is a resin system containing a cationic polymerizable unsaturated group, the photopolymerization initiator used may be an aromatic diazonium salt, an aromatic sulfonium salt, an aromatic iodonium salt, a metallocene compound, a benzoin sulfonic acid ester, or a mixture of these. The amount of the photopolymerization initiator is about 0.1 to 10 parts by mass per 100 parts by mass of the ionizing radiation-curable resin component.

The ionizing radiation-curable resin composition may further contain additives, if needed. Examples of the additives include thermoplastic resins (e.g., urethane resins, polyvinyl acetal resins, polyester resins, polyolefin resins, styrene resins, polyamide resins, polycarbonate resins, acetal resins, vinyl chloride-vinyl acetate copolymers, vinyl acetate resins, acrylic resins, cellulose resins), lubricants (e.g., silicone resins, wax, fluororesins), ultraviolet absorbers (e.g., benzotriazole, benzophenone, triazine), light stabilizers (e.g., hindered amine radical scavengers), and colorants (e.g., dyes, pigments).

The electron beam source for the ionizing radiation used may be, for example, an electron beam accelerator of any type (Cockcroft-Walton type, Van de Graaff type, resonant transformer type, insulating core transformer type, linear type, Dynamitron type, radio frequency type) capable of delivering electrons having an energy of 70-1000 keV. The electron beam dose is preferably, for example, about 1-10 Mrad.

The UV source for the ionizing radiation may be, for example, a light source such as an ultra-high pressure mercury lamp, a high-pressure mercury lamp, a low-pressure mercury lamp, a carbon-arc lamp, a black light, or a metal halide lamp. The ultraviolet light used typically has a wavelength within a range of 190 to 380 nm.

The surface protective layer may have any thickness. The lower limit is preferably 0.1 μm and the upper limit is preferably 50 μm. The lower limit is more preferably 1 μm and the upper limit is more preferably 30 μm. When the surface protective layer has a thickness of smaller than 0.1 μm, sufficient durability (e.g., scratch resistance, contamination resistance, weather resistance) may not be imparted. When the surface protective layer has a thickness of larger than 50 μm, the transparent resin film of the present invention may have a lower transmittance, resulting in lower visibility of the picture of the picture layer.

The primer layers (the adhesion primer layer 12 and the primer layer for a surface protective layer) preferably contain a binder resin.

Examples of the binder resin contained in the primer layers include urethane resins, acrylic resins, acrylic-urethane resins, acrylic-urethane copolymers, cellulosic resins, polyester resins, and vinyl chloride-vinyl acetate copolymers. In the case where the ionizing radiation-curable resin composition for a surface protective layer described later contains a urethane acrylate oligomer, the binder resin preferably contains a urethane resin from the standpoint of the adhesion between the picture layer and the transparent resin film described above and the production efficiency.

The primer layers preferably contain an ultraviolet absorber.

In particular, the adhesion primer layer 12 containing an ultraviolet absorber can favorably impart weather resistance to the decorative board of the present invention.

The ultraviolet absorber may be, for example, an organic or inorganic ultraviolet absorber. In particular, preferred is an organic ultraviolet absorber for its excellent transparency.

Examples of the organic ultraviolet absorber include: benzotriazole ultraviolet absorbers such as 2'-hydroxyphenyl-5-chlorobenzotriazole ultraviolet absorbers (e.g., 2-(2'-hydroxy-3',5'-di-tert-butylphenyl)-5-chlorobenzotriazole, 2-(2'-hydroxy-3'-tert-butyl-5'-methylphenyl)-5-chlorobenzotriazole, 2-(2'-hydroxy-3'-tert-amyl-5'-methylphenyl)-5-chlorobenzotriazole, 2-(2'-hydroxy-3'-isobutyl-5'-methylphenyl)-5-chlorobenzotriazole, 2-(2'-hydroxy-3'-isobutyl-5'-propylphenyl)-5-chlorobenzotriazole) and 2'-hydroxyphenyl benzotriazole ultraviolet absorbers (e.g., 2-(2'-hydroxy-3',5'-di-tert-butylphenyl)benzotriazole, 2-(2'-hydroxy-5'-methylphenyl)benzotriazole); benzophenone ultraviolet absorbers such as 2,2'-dihydroxybenzophenone ultraviolet absorbers (e.g., 2,2'-dihydroxy-4-methoxybenzophenone, 2,2'-dihydroxy-4,4'-dimethoxybenzophenone, 2,2'-dihydroxy-4,4'-tetrahydroxybenzophenone) and 2-hydroxybenzophenone ultraviolet absorbers (e.g., 2-hydroxy-4-methoxybenzophenone, 2,4-dihydroxybenzophenone); and salicylic acid ester ultraviolet absorbers such as phenyl salicylate and 4-t-butyl-phenyl-salicylate.

In particular, preferred are triazine ultraviolet absorbers from the standpoint of favorably imparting the weather resistance, design properties, and bleed resistance.

Examples of the triazine ultraviolet absorbers include 2,4-bis(2,4-dimethylphenyl)-6-(2-hydroxy-4-n-octyloxyphenyl)-1,3,5-triazine, 2-(2,4-dihydroxyphenyl)-4,6-bis(2,4-dimethylphenyl)-1,3,5-triazine, 2-(2,4-dihydroxyphenyl)-4,6-diphenyl-1,3,5-triazine, 4,4',4"-(1,3,5-triazine-2,4,6-triyltriimino)trisbenzoic acid tris(2-ethylhexyl)ester, 2-(2-hydroxy-4-methoxyphenyl)-4,6-diphenyl-1,3,5-triazine, N,N',N"-tri(m-tolyl)-1,3,5-triazine-2,4,6-triamine, 2,4,6-tris (4-butoxy-2-hydroxyphenyl)-1,3,5-triazine, and 2-(4,6-diphenyl-1,3,5-triazine-2-yl)-5-[2-(2-ethylhexanoyloxy) ethoxy]phenol.

Also usable is a reactive ultraviolet absorber in which an acryloyl or methacryloyl group is introduced into a benzotriazole skeleton. In the case where the required transparency is not high, an inorganic ultraviolet absorber may be added. Examples of the inorganic ultraviolet absorber include titanium oxide, cerium oxide, and iron oxide having a particle size of 0.2 μm or smaller.

The amount of the ultraviolet absorber in the primer layers is appropriately determined in a manner that the UV transmittance is set within the above range in consideration of the UV absorption capacity of the ultraviolet absorber used.

In the case where a triazine ultraviolet absorber is used as the ultraviolet absorber, the amount thereof in the primer layers is preferably 1 to 10% by mass, more preferably 2% by mass or more and 7% by mass or less. When the amount is less than 1% by mass, the weather resistance imparted may be insufficient. When the amount is more than 10% by mass, the design properties of the transparent resin film of the present invention or the film formation properties or processability may be lowered.

The primer layers each preferably has a thickness of 0.5 μm or larger and 10 μm or smaller. When the thickness of each primer layer is 0.5 μm or larger, the adhesion between the transparent resin film of the present invention and a picture layer described later or a surface protective layer is favorably ensured. When the thickness of each primer layer is 10 μm or smaller, the transparent resin film of the present invention is favorably not too thick.

The primer layers each may contain inorganic fine particles such as silica particles.

The transparent resin film of the present invention is used for protecting a picture layer provided on one surface of a substrate. When the transparent resin film of the present invention and the picture layer are laminated with an adhesive layer to be formed into a decorative board, the adhesion properties between the layers are excellent owing to a predetermined pattern of protrusions and depressions on a contact surface of the transparent resin film. Moreover, air bubbles are not likely to enter into the pattern of protrusions and depressions, so that the design properties achieved are excellent.

The present invention also encompasses such a decorative board in which a picture layer is provided on one surface of a substrate and the transparent resin film of the present invention is provided on the opposite side to the substrate side of the picture layer.

Figure 3:
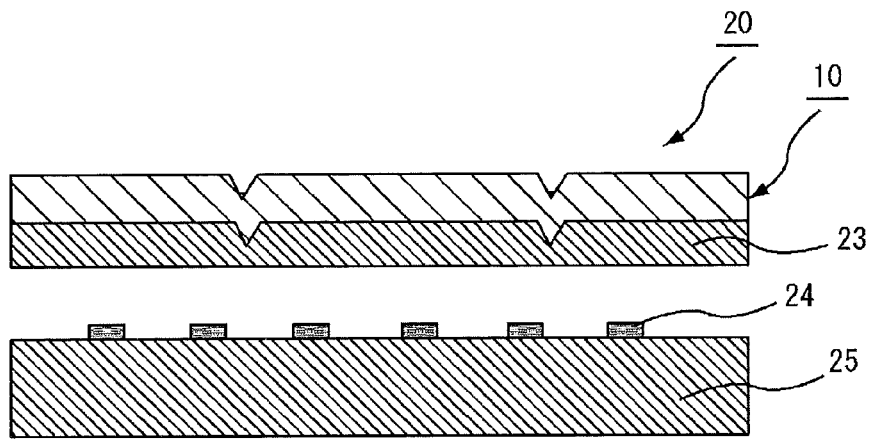
FIG. 3 is a schematic view illustrating a cross section of a preferred example of the decorative board of the present invention.

A preferred example of the decorative board of the present invention is described with reference to FIG. 3.

In a decorative board 20 of the present invention, a picture layer 24 is laminated on one surface of a substrate 25, and a transparent resin film 10 of the present invention is laminated on the opposite side to the substrate 25 side of the picture layer 24.

From the standpoint of further increasing the adhesion strength between the picture layer 24 and the transparent resin film 10 of the present invention, an adhesive layer 23 is preferably provided.

The components of the decorative board of the present invention are described hereinbelow.

The substrate is not limited and is appropriately determined, for example, according to the application of the decorative board including the transparent resin film of the present invention.

The substrate may be made of any known material such as a resin material, a wood material, or a metal material. In particular, the material of the substrate is preferably a resin material or a wood material for its rigidity and lightness. The material may also be a composite material of these.

The resin material preferably contains, for example, a thermoplastic resin.

Preferred examples of the thermoplastic resin include: polyvinyl resins such as polyvinyl chloride resins, polyvinyl acetate resins, and polyvinyl alcohol resins; polyolefin resins such as polyethylene, polypropylene, polystyrene, ethylene-vinyl acetate copolymer resins (EVA), and ethylene-(meth) acrylic acid resins; polyester resins such as polyethylene terephthalate resins (PET resins); homopolymers and copolymers of thermoplastic resins such as acrylic resins, polycarbonate resins, polyurethane resins, acrylonitrile-butadiene-styrene copolymer resins (ABS resins), and acrylonitrile-styrene copolymer resins; and resin mixtures of these. In particular, preferred are polyolefin resins, acrylonitrile-butadiene-styrene copolymer resins, polyvinyl chloride resins, and ionomers. The resin material may be foamed.

Examples of the wood material include various materials such as cedar, cypress, zelkova, pine, lauan, teak, and Melapi. The core may be any of sliced veneers, single panels, plywood panels (including LVL), particle boards, medium-density fiberboards (MDF), high-density fiberboards (HDF), and bonded wood made from the above materials and laminated materials prepared by appropriately laminating these.

Examples of the metal material include iron.

The substrate may contain an inorganic compound.

In the case where the substrate is formed of multiple resin substrates, the types of the resins forming the multiple resin substrates may be the same or different, and the thicknesses of the multiple resin substrates may be the same or different.

In the present invention, the substrate may have a hollow structure or partially have a slit or a through hole. Alternatively, the substrate may be in the shape of a frame prepared from the above materials used in combination.

The substrate may have any thickness. The thickness is preferably, for example, 0.01 mm or larger, more preferably 0.1 mm or larger and 50 mm or smaller.

The substrate may have a substantially plate shape, such as those including protrusions and depressions or a curved surface.

A picture layer is laminated on one side of the substrate.

The picture layer is a layer for imparting decorativeness to the decorative board of the present invention including the transparent resin film of the present invention. The picture layer may be, for example, a uniformly colored hiding layer (solid print layer), a design layer formed by printing various patterns using ink and a printer, or a layer combining a hiding layer and a design layer (hereafter, referred to as a pattern layer).

The hiding layer can add an intended color to the substrate which may be stained or colored unevenly, thereby adjusting the color of the surface.

The design layer can provide the decorative board with various patterns such as wood-grain patterns, stone grain patterns imitating the surface of a rock such as marble patterns (e.g., pattern of travertine marble), fabric patterns imitating fabric texture or fabric-like patterns, tiled patterns, brick-masonry patterns, and parquet or patchwork patterns which are combinations of the above patterns. These patterns are formed by typical polychromic printing in process colors including yellow, red, blue, and black, or polychromic printing in spot colors in which plates of individual colors constituting the pattern are used.

The ink composition used for the picture layer is a composition prepared by appropriately mixing a binder resin with a colorant such as a pigment and a dye, an extender pigment, a solvent, a stabilizer, a plasticizer, a catalyst, a curing agent, and the like. Any binder resin may be used. Preferred examples thereof include urethane resins, acrylic resins, acrylic-urethane resins, acrylic-urethane copolymer resins, vinyl chloride/vinyl acetate copolymer resins, vinyl chloride/vinyl acetate/acrylic copolymer resins, polyester resins, and nitrocellulose resins. Any of these binder resins may be used alone or in combination of two or more.

Preferred examples of the colorant include: inorganic pigments such as carbon black (Chinese ink), iron black, titanium white, antimony white, chrome yellow, titanium yellow, red iron oxide, cadmium red, ultramarine, and cobalt blue; organic pigments or dyes such as quinacridone red, iso-indolinone yellow, and phthalocyanine blue; metal pigments formed of foil flakes of aluminum, brass, and the like; and pearl-like luster pigments (pearl pigments) formed of foil flakes of titanium dioxide-coated mica, basic lead carbonate, and the like.

The picture layer may have any thickness. The thickness is preferably 0.1 µm or larger, more preferably 0.5 µm or larger and 600 µm or smaller. Having a thickness within the range indicated above, the picture layer can impart an excellent design to the decorative board of the present invention and also can have hiding properties.

In the case where the substrate itself has design properties, such as the case of using sliced veneers, a picture layer may not be provided.

The decorative board of the present invention may have any thickness. The thickness is preferably, for example, 0.05 mm or larger, more preferably 1 mm or larger and 50 mm or smaller.

The decorative board of the present invention preferably includes an adhesive layer between the picture layer and the transparent resin film of the present invention.

The adhesive layer is a layer provided between the picture layer and the thermoplastic resin layer included in the transparent resin film of the present invention. The adhesive layer can further increase the adhesion strength between the picture layer and the transparent resin film of the present invention.

The transparent resin film of the present invention described above has a predetermined pattern of protrusions and depressions on a picture layer side surface (contact surface) to have a larger contact area between the adhesive layer and the contact surface, resulting in excellent adhesion of the adhesive layer. Since the pattern of protrusions and depressions is controlled to a predetermined pattern, entering of air bubbles between the adhesive layer and the pattern of protrusions and depressions can be prevented.

The adhesive layer preferably contains an ultraviolet absorber from the standpoint of imparting further excellent weather resistance to the decorative board of the present invention.

Specifically, the adhesive layer more preferably contains an ultraviolet absorber in an amount of 0.5 to 2% by mass. The ultraviolet absorber contained within the above range can impart further excellent weather resistance to the decorative board of the present invention.

The adhesive layer still more preferably contains an ultraviolet absorber in an amount of 1.0 to 1.5% by mass.

The ultraviolet absorber contained in the adhesive layer is favorably the ultraviolet absorber used for the primer layers described above, more favorably a triazine ultraviolet absorber.

The adhesive layer preferably contains a binder resin.

Examples of the binder rein contained in the adhesive layer is favorably the binder resin used for the primer layers described above.

The decorative board of the present invention may be produced by lamination of the substrate, the picture layer, and the transparent resin film using, for example, an adhesive forming the adhesive layer described above.

In particular, the method for producing the decorative board preferably includes: forming an adhesive layer on the picture layer side surface of the transparent resin film; and bonding the transparent resin film and the picture layer with the adhesive layer.

The present invention also encompasses such a method for producing the decorative board of the present invention.

In the case of the transparent resin film, the pattern of protrusions and depressions is formed on the surface protective layer side by embossing or the like. At this time, a bit of a pattern of protrusions and depressions corresponding to the pattern of protrusions and depressions on the embossed side is unintendedly formed on the surface on the opposite side (picture layer side) to the surface subjected to embossing. In such a case, air entrainment, i.e., a phenomenon that air enters into the pattern of protrusions and depressions on the picture layer side of the transparent resin film, may occur to lower the design properties.

Since the method for producing the decorative board of the present invention includes a step of forming an adhesive layer on the picture layer side surface of the transparent resin film, the adhesive layer is provided even at a depression of the pattern of protrusions and depressions on the picture layer side, the air entrainment can be prevented, thereby suppressing impairment of the design properties.

EXAMPLES

The present invention is more specifically described with reference to, but not limited to, examples hereinbelow.

Example 1

To one surface of a transparent polypropylene film (thickness of 60 µm) was applied a two-component curable urethane resin containing isocyanate as a curing agent. Thus, an adhesion primer layer having a thickness of 2 µm was obtained.

To the other surface of the transparent polypropylene film (surface on the opposite side to the adhesion primer layer side) was melt-extruded and thermal laminated a transparent polypropylene resin (thickness of 200 µm). Thus, a thermoplastic resin layer was obtained.

The surface on the transparent polypropylene resin (thickness of 200 µm) side of the thermoplastic resin layer was subjected to corona treatment. Then, to the surface was applied a two-component curable urethane resin containing isocyanate as a curing agent. Thus, a primer layer for a surface protective layer having a thickness of 2 µm was obtained.

To the surface of the primer layer for a surface protective layer was applied by gravure coating a urethane (meth) acrylate that was an ionizing radiation-curable resin as a surface protective layer. The applied resin was irradiated with an electron beam at an accelerating voltage of 165 keV and 5 Mrad, thereby forming a surface protective layer having a thickness of 15 μm.

After heating of the surface protective layer side with a contactless infrared heater, the surface protective layer side surface was brought into contact with an embossing plate (Rz: 25.1 μm), pressed at 120° C. and 55 kg/cm² for 180 seconds, thereby forming a pattern of protrusions and depressions. Thus, a transparent resin film was obtained.

Separately, a HDF (thickness of 3 mm) was provided. On one surface of the HDF was formed a picture layer having a thickness of 2 μm using an inkjet printer. Thus, a substrate was provided.

To the surface on the adhesion primer layer side of the obtained transparent resin film was applied a two-component curable polyester resin (thickness of 50 μm) containing isocyanate as a curing agent, thereby forming an adhesive layer. The obtained transparent resin film and the substrate were laminated in a manner that the adhesion primer layer side of the transparent resin film was in contact with the picture layer side of the substrate. The laminate was allowed to stand in a room-temperature environment under a pressure of 10 kg/m² for three days.

The thickness at a depression of the pattern of protrusions and depressions of the transparent resin film was as shown in Table 1.

Examples 2 to 6, Comparative Examples 1 and 2

A transparent resin film and a decorative board were produced as in Example 1, except that the embossing plate was changed to form the patterns of protrusions and depressions on the surface and the contact surface in accordance with the sizes shown in Table 1. The transparent resin film had a thickness at a depression of the pattern of protrusions and depressions as shown in Table 1.

The contact area ratio relative to Comparative Example 1 shown in Table 1 was determined as follows. The Sdr values of the adhesion primer layer side surfaces of the transparent resin films obtained in Examples 1 to 6 and Comparative Example 2 and Comparative Example 1 were obtained as their surface areas using a roughness meter (product name: VR-3200 One-shot 3D Measuring Macroscope, available from KEYENCE CORPORATION) in the wide viewing angle mode under 25× magnification on a 15" monitor (12 mm (horizontal)×9 mm (vertical)) in accordance with ISO25178. The contact area ratio was calculated by [(Sdr of primer layer surface of any of Examples 1 to 6 and Comparative Example 2)/(Sdr of primer layer surface of Comparative Example 1)].

<Adhesion Strength>

For the examples and comparative examples, the obtained transparent resin film and the substrate were laminated in a manner that the surface on the opposite side to the side having the pattern of protrusions and depressions of the transparent resin film was in contact with the picture layer side surface of the substrate. Then, adhesion strength thereof was evaluated. Table 1 shows the results.

For each of the decorative boards obtained in the examples and comparative examples, the peeling strength [N/25 mm width] was determined with a Tensilon universal testing machine "RTC-1250A" (available from Orientec Co., Ltd.) by peeling the transparent resin film from the substrate including the picture layer at a tensile speed of 200 mm/min and a peeling angle of 180°.

<Presence or Absence of Air Bubbles>

The printed patterns of the decorative boards obtained in the examples and comparative examples were visually checked, and evaluated based on the following criteria. Table 1 shows the results.

++: The printed pattern was visible clearly.
+: The printed pattern seemed discolored (blurred) slightly.
−: The printed patter was not visible clearly.

<Maximum Height Roughness>

For each of the obtained transparent resin films in the examples and comparative examples, the maximum height roughness on the surface protective layer side surface (maximum height roughness on the surface) and the maximum height roughness on the adhesion primer layer side surface (maximum height roughness on the contact surface) were measured with a surface profilometer (product name: SURFCOM FLEX-50A, available from Tokyo Seimitsu Co., Ltd.) in accordance with JIS B 0601 (2001) under the conditions of the evaluation length: 12.5 mm, the measurement speed: 0.6 mm/s, the cut-off value: 2.5 mm, the filter type: Gaussian filter, the form elimination: straight line, and the 2s value: 8.0 μm. Table 1 shows the results.

<Tactile Impression>

For the decorative boards obtained in the examples and comparative examples, the tactile impression was checked by ten adult men and women testers, and evaluated based on the following criteria. Table 1 shows the results.

++: At least nine testers thought the tactile impression was good.
+: At least six testers thought the tactile impression was good.
−: Less than six testers thought the tactile impression was good.

<Design Visibility>

The decorative boards obtained in the examples and comparative examples were visually observed and evaluated based on the following criteria. Table 1 shows the results.

++: The printed pattern on the picture layer was visible clearly.
+: The printed pattern on the picture layer seemed slightly discolored (blurred).
−: The printed pattern on the picture layer was not visible clearly.

TABLE 1

| Item | Unit | Example 1 | Example 2 | Example 3 | Example 4 | Comparative Example 1 | Comparative Example 2 | Example 5 | Example 6 |
|---|---|---|---|---|---|---|---|---|---|
| Maximum height roughness on surface | (μm) | 50 | 80 | 100 | 30 | 20 | 120 | 20 | 130 |
| Maximum height roughness on contact surface | (μm) | 25 | 40 | 70 | 15 | 10 | 80 | 15 | 70 |
| Thickness of adhesive layer | (μm) | 50 | 50 | 50 | 50 | 50 | 50 | 50 | 50 |

TABLE 1-continued

| Item | Unit | Example 1 | Example 2 | Example 3 | Example 4 | Comparative Example 1 | Comparative Example 2 | Example 5 | Example 6 |
|---|---|---|---|---|---|---|---|---|---|
| Thickness at depression of pattern of protrusions and depressions | (μm) | 254 | 239 | 249 | 264 | 269 | 239 | 274 | 219 |
| Adhesion strength | N/25 mm | 45 | 50 | 55 | 40 | 35 | 50 | 40 | 55 |
| Contact area ratio relative to Comparative Example 1 | (%) | 120 | 130 | 140 | 110 | 100 | 130 | 110 | 140 |
| Presence or absence of air bubbles | — | ++ | ++ | + | ++ | ++ | − | ++ | + |
| Tactile impression |  | + | ++ | ++ | + | − | ++ | − | ++ |
| Design visibility |  | ++ | ++ | + | ++ | ++ | − | ++ | − |

INDUSTRIAL APPLICABILITY

The present invention can provide a transparent resin film that is capable of imparting excellent design properties to a decorative board and is excellent in adhesion properties. The decorative board of the present invention having excellent design properties and excellent adhesion properties is favorably used for floors, fittings, and doors (e.g., sliding doors) for housing.

REFERENCE SIGNS LIST

10: transparent resin film
12: adhesion primer layer
13: surface protective layer
14: thermoplastic resin layer
20: decorative board
23: adhesive layer
24: picture layer
25: substrate

The invention claimed is:

1. A transparent resin film for protecting a picture layer provided on one side of a substrate,
wherein the transparent resin film includes an adhesion primer layer on the picture layer side, a surface protective layer on an opposite side to the picture layer side, a thermoplastic resin layer between the adhesion primer layer and the surface protective layer, and
the transparent resin film having a pattern of protrusions and depressions on a picture layer side, the pattern of protrusions and depressions having a maximum height roughness Rz defined in JIS B 0601 (2001) within a range of 15 μm or larger and 70 μm or smaller.

2. The transparent resin film according to claim 1,
wherein the transparent resin film has a pattern of protrusions and depressions on an opposite side to the picture layer side, and the pattern of protrusions and depressions has a maximum height roughness Rz defined in JIS B 0601 (2001) within a range of 30 μm or larger and 100 μm or smaller.

3. A decorative board comprising:
a substrate;
a picture layer; and
the transparent resin film according to claim 1, in a stated order in a thickness direction.

4. A method for producing the decorative board according to claim 3, the method comprising:
forming an adhesive layer on a picture layer side of a transparent resin film; and
bonding the transparent resin film and the picture layer with the adhesive layer.

5. A decorative board comprising:
a substrate;
a picture layer; and
the transparent resin film according to claim 2, in a stated order in a thickness direction.

6. A method for producing the decorative board according to claim 2, the method comprising:
forming an adhesive layer on a picture layer side of a transparent resin film; and
bonding the transparent resin film and the picture layer with the adhesive layer.

* * * * *